Oct. 26, 1965  A. A. ANDERSON  3,213,600
GRASS CATCHING ATTACHMENT FOR ROTARY MOWERS
Filed May 13, 1964  3 Sheets-Sheet 1
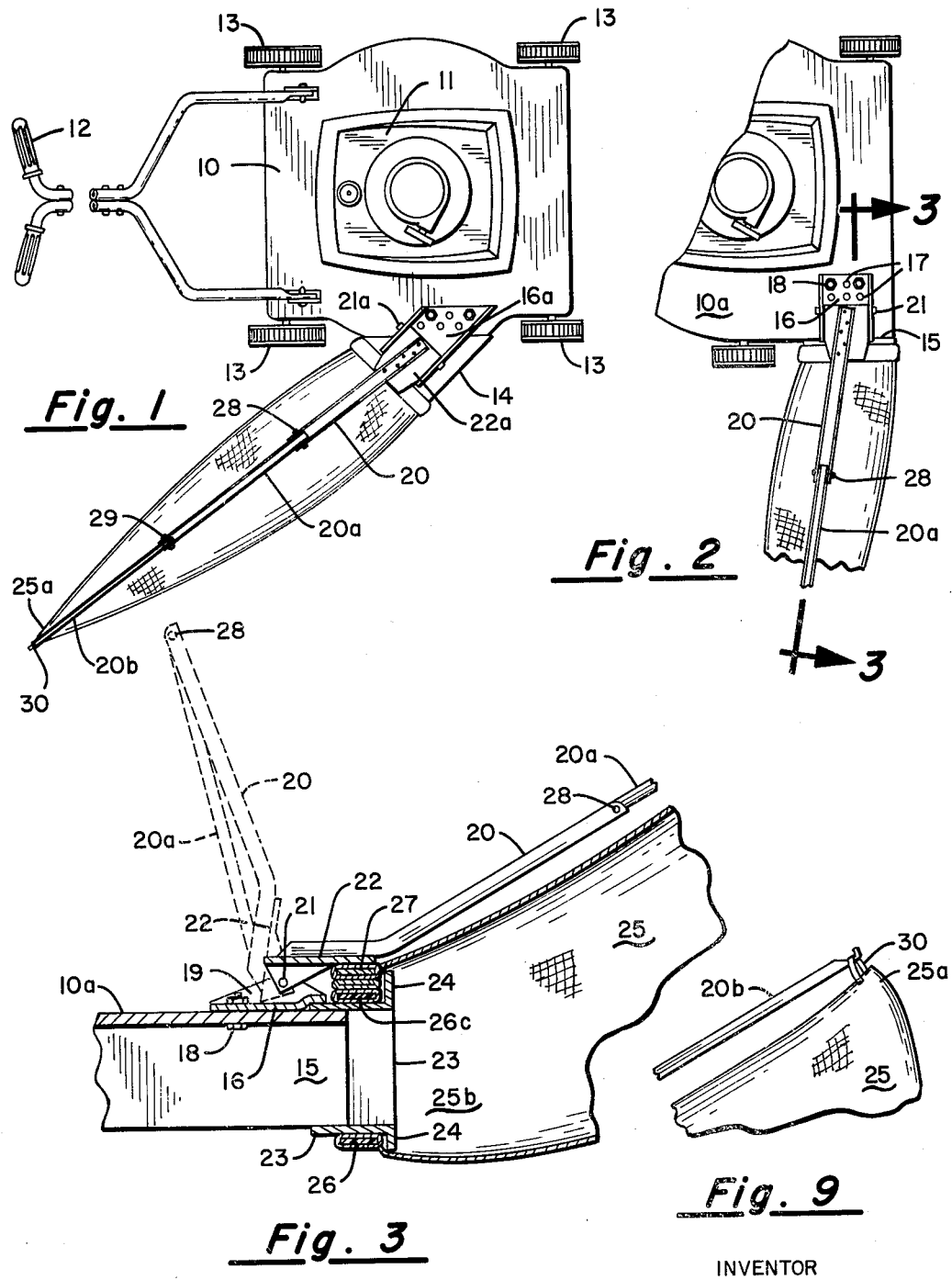
INVENTOR
ARTHUR A. ANDERSON
BY John E. Stryker
ATTORNEY

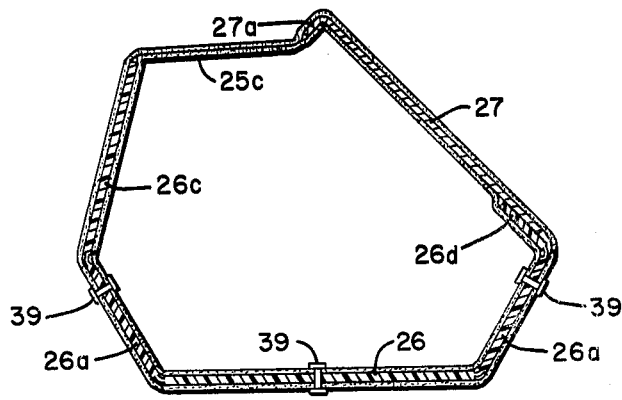
Fig. 7a
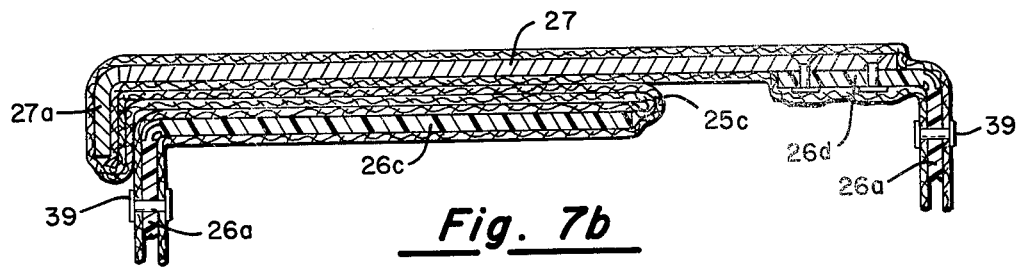
Fig. 7b
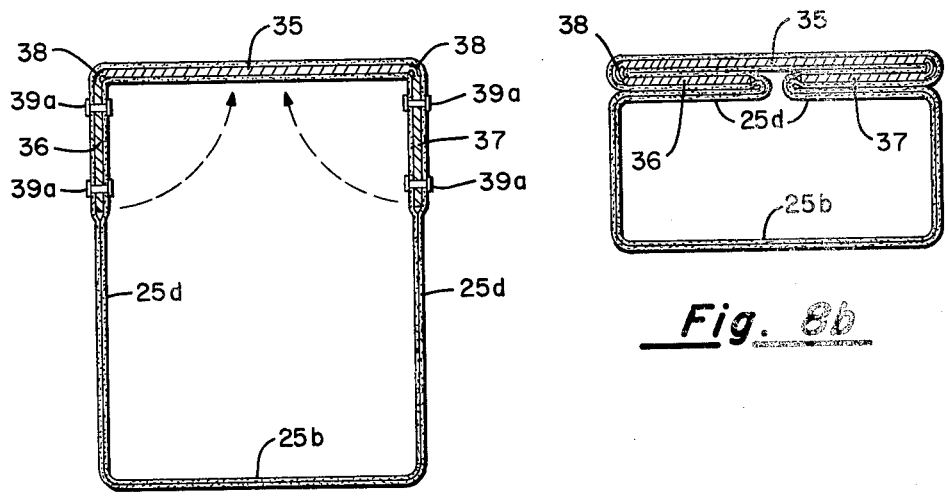
Fig. 8a
Fig. 8b

United States Patent Office 3,213,600
Patented Oct. 26, 1965

3,213,600
GRASS CATCHING ATTACHMENT FOR
ROTARY MOWERS
Arthur A. Anderson, St. Paul, Minn., assignor to The Specialty Mfg. Co., St. Paul, Minn., a corporation of Minnesota
Filed May. 13, 1964, Ser. No. 367,075
2 Claims. (Cl. 56—202)

This invention relates to improved grass catchers of the bag type for rotary mowers having power driven rotary blades within a housing formed with a side opening through which the grass cuttings are discharged.

Bag type grass catchers with attaching and supporting means for rotary mowers have been in use for a number of years but the means heretofore provided for attaching the bags and for permitting the removal and emptying of the bags have not been entirely satisfactory. The attaching means usually include a frame defining the inlet opening of the bag and various means for supporting the bag on the housing or otherwise on the mower have been provided. Since the discharge opening of the mower housing is restricted, the bag should be provided with a considerably larger opening through which the cuttings may be emptied when the bag has been filled. Bags made from air permeable fabric or cloth have been provided with a filling neck or mouth openings and drawstrings adapted to contact the bag neck opening and cause the neck to embrace an outlet chute or other tubular member fastened to the mower housing. Other catcher bags have been provided with outlet opening closures of the slide fastener or talon type. Such fastening means have caused trouble due to the nature of the grass cuttings which clog or jam the talons or teeth of the slide fasteners.

It is therefore, an object of the present invention to provide simplified and more readily attachable and detachable means for fastening a grass catcher bag to a mower housing.

Another object is to provide bag fastening means disposed to reinforce a wide expansible mouth end portion of a grass catcher bag and to facilitate the expansion and contraction of said mouth portion of the bag when it is to be emptied of its contents.

A further and particular object is to provide bag attaching means of the class described comprising a plurality of normally straight, substantially rigid members hingedly joined together and connected to the mouth portion of the bag, said members being extensible and retractable angularly one relative to the others to permit selective expansion and contraction of the mouth of the bag, and including means for detachably securing the hingedly members in retracted angular positions on the mower housing.

Other objects will appear and be more fully pointed out in the following specification and claims.

The invention will be best understood by reference to the accompanying drawings which illustrate, by way of example and not for the purpose of limitation, preferred and modified forms of my invention:

FIGURE 1 is a plan view showing one modified form of the invention mounted on a rotary lawn mower of common type;

FIG. 2 shows the invention attached to another mower of common type;

FIG. 3 is a fragmentary vertical sectional view taken on the line 3—3 of FIG. 2;

FIG. 6b is a fragmentary sectional view taken on the line 6b—6b of FIG. 6a;

FIG. 7a is a sectional view showing the reinforcing members and latch bar in extended angular positions, with the bag opening in fully open or extended position;

FIG. 7b is a fragmentary longitudinal sectional view through the latch bar and adjacent portions of the hingedly connected members confined in the hem of the bag;

FIG. 8a is a fragmentary longitudinal sectional view through the fastening members of a modified form of the invention in the extended or open position;

FIG. 8b is a similar sectional view of the modified invention of FIG. 8a, showing the fastening members folded in position to gather the mouth of the bag as in the position for engagement with the bag attaching means on the mower, and FIG. 9 is a fragmentary side elevational view showing the means for attaching the bag to the outer end of a supporting arm member.

Figure 4:
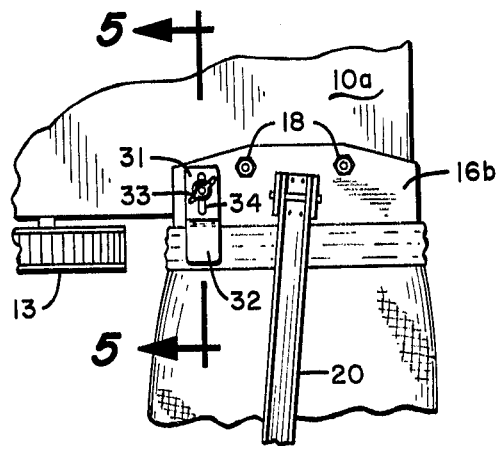
FIG. 4 is a fragmentary plan view showing a modified form of clamping device for detachably securing the bag to the mower.

FIG. 1 shows a common type of rotary mower having a housing 10 enclosing rotary grass cutting blades (now shown), an internal combustion engine in indicated at 11 for rotating the cutting blades and handles 12 for steering a mower supported on wheels 13. As further shown in FIG. 1, a grass outlet chute 14 extends obliquely and rearwardly from one side of the housing 10. The mower shown in FIG. 2 is similar to that shown in FIG. 1 except that an outlet opening 15 for the grass cuttings is located at the front end of the housing 10a so that the cuttings are discharged laterally, substantially at right angles to the longitudinal center plane of the mower.

My improved bag attaching means include a bracket 16 formed with several holes 17 to receive bolts 18 for securing the bracket to the mower housing 10a. A similar bracket 16a is shown on the mower of FIG. 1. By providing a group of holes for the bolts 18 or other threaded fastening means, the brackets 16, 16a are adapted to be mounted on mowers marketed by the several manufacturers. The bracket 16 is formed with a pair of parallel upstanding flanges 19 adapted to be hingedly connected to a bag supporting arm 20 by a hinge pin 21. The arm 20 is rigidly connected by welding or otherwise to a pressure plate 22, which, as hereinafter described, is disposed to clamp bag fastening members to the mower. A tubular extension 23 projects laterally from the bracket 16 to define a restricted outlet for the grass clippings, leaves and other material discharged by the machine. A flange 24 projects in a vertical plane from the outer end of the tubular member 23.

An air pervious bag, indicated generally by the numeral 25, is provided to receive the cuttings and other material from the restricted tubular member 23. The bag 25 has a closed end 25a and an open end or mouth portion 25b adapted to be gathered about the tubular member 23 adjacent to flange 24. Preferably the bag has straight sides so that there is no restriction or reduced neck portion which could obstruct the discharge or free flow of cuttings and other contents of the bag when it is to be emptied.

Figure 6A:
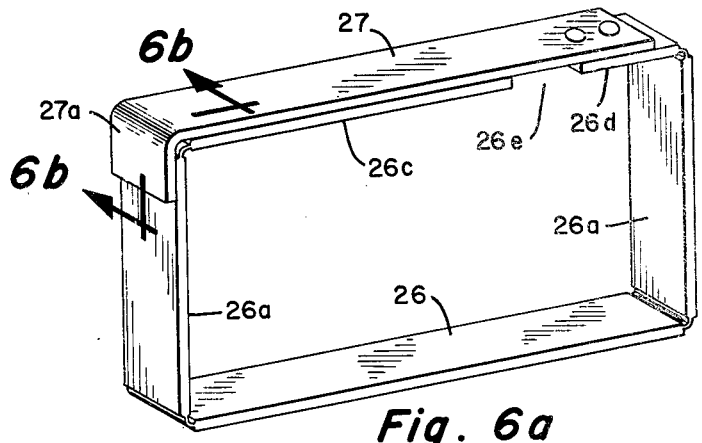
FIG. 6a is a perspective view showing the bag reinforcing and attaching means separated from the bag and comprising a plurality of normally straight, substantially rigid members hingedly joined together and a latch bar joining the hinge members together across an opening at one side thereof.
Figure 6B:
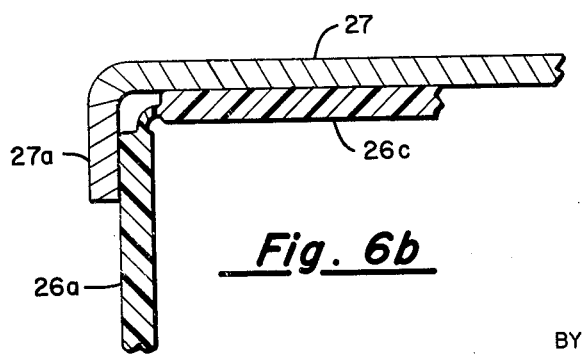

As shown in detail in FIG. 6a bag attaching and reinforcing members include a bottom member 26 hingedly connected to end members 26a. The normally upper ends of the members 26a are hingedly connected to the upper side members 26c and 26d having a gap or opening 26e between them. A rigid bar 27 has one end connected by rivets or the like to the member 26d and the other end formed with an angularly bent hook member 27a adapted to engage and confine the upper end portion of the adjacent member 26a.

The mouth end 25b of the bag 25 has a hem forming a peripheral tube in which the members 26, 26a, 26b, 26c and 26d and bar 27 are confined. As a result of the almost friction free hinge connections between the members including the member 26, the pressure of the grass in the normal emptying operation automatically opens the mouth 25b to its fullest extent. As best shown in FIG. 7a, the several members 26, 26a, 26b, 26c, 27 and 27a may be angularly extended when the bag is detached from the mower so that the mouth opening of the bag may be extended to its fullest extent with a portion 25c of bag hem extending between the hook member 27a and adjacent end of the member 26c. When the bag is to be attached to the mower, the several attaching members are angularly folded so that the mouth portion of the bag is gathered to fit the exterior of the tubular extension 23 adjacent to the flange 24. The folds of bag material are best shown in FIG. 7b wherein the bar 27 is shown in its closed or latched position with the portion 25c of the bag hem folded between the bar 27 and member 26c. To retain this bar and the several hingedly connected attaching members securely about the tubular extension 23 it is only necessary to apply pressure to the upper side of the bar 27. Such pressure may be applied by the clamp plate 22 (FIG. 2) when the arm 20 is lowered and extended in position to support the bag in grass-receiving position. This arm is preferably constructed from channel shaped members 20, 20a and 20b which overlap and are pivotally connected together by hinge pins 28 and 29. The closed outer end 25a of the bag 25 may be supported on the arm member 20b by a loop 30 engaged with notch formed in the arm member as indicated in FIG. 9. It will be evident that as the weight of the bag is increased by filling with grass, etc. the pressure of the plate 22 against the upper face of the bar 27 will increase proportionately. When the bag is not in use, it may be removed from the mower and the arm 20 may be folded to the retracted position indicated in broken lines in FIG. 3.

Figure 5:
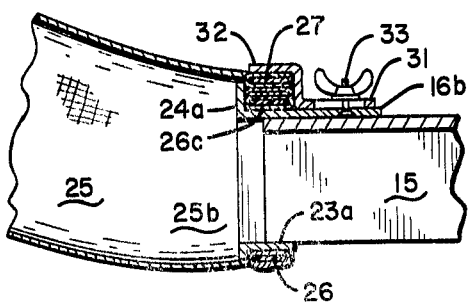
FIG. 5 is a fragmentary cross sectional view taken on line 5—5 of FIG. 4.

Referring to the modification of my invention shown in FIGS. 4 and 5, a bracket plate 16b is secured by bolts 18 to the mower housing 10a directly above the discharge opening 15. A tubular extension 23a projects from the bracket plate 16a and a vertically disposed flange 24a is formed on the open end of the extension 23a. The bag 25 may be attached to the extension 23a by using hingedly connected members such as those hereinbefore described, including members 26, 26a, 26b, 26c and latch bar 27, all of which are confined in the hem at the open end of the bag. Clamping means for retaining the open end of the bag in gathered position on the tubular extension 23 may comprise a clip 31 of generally Z shape having a rigid member 32 adapted to overlie the folded bag retaining members and bag seam portion. A wing bolt 33 is rigidly connected to the bracket plate 16b and projects through an elongated slot 34 formed in the clip 31. When the nut on the wing bolt 33 is tightened, the clip member 32 compresses and retains the bag and its mouth reinforcing members under compression on the mower housing adjacent to the flange 24a. The arm 20 for supporting the outer end portion of the bag may be hingedly connected to the plate 16b so that the arm may be retracted to a position above the mower housing when the bag is not in use. To release the bag from the mower housing, it is only necessary to loosen the nut on wing bolt 33 and retract the clip 31 thereby releasing the bag mouth reinforcing members and allowing the bag opening to be expanded as indicated in FIG. 7a.

Referring to the modification of the invention shown in FIGS. 8a and 8b, the portion 25b of the bag is formed at its open end with a tubular hem like that hereinbefore described. Mounted within the confines of the hem are reinforcing and attaching members 35, 36 and 37. These substantially rigid members are hingedly connected together along fold lines 38 so that the mouth end portion of the bag may be gathered or contracted easily around the tubular extension 23 or 23a of the bracket merely by folding the members 36 and 37 inwardly to overlie the bottom side of the member 35, as indicated in FIG. 8b. Thus the hem portion of the bag is merely wrapped around the tubular extension adjacent to the flange 24 or 24a so that the portions 25d are folded inward along the lower side of the members 36 and 37, as indicated in FIG. 8b. When in place on the tubular extension adjacent to the flange 24 or 24a the member 35 and underlying members 36 and 37 may be confined under compression by suitable clamping means. Examples of suitable clamping means are the plate 22 or 22a shown in FIGS. 1, 2 and 3 and a clip and wing bolt clamp shown in FIGS. 4 and 5. When a bag is to be removed from the mower the clamping pressure is removed and the members 36 and 37 are extended, as indicated in FIG. 8a, allowing the mouth of the bag to be extended to fully open position.

Strips of substantially rigid synthetic resin or plastic material may be used to form the members 26, 26a, 26c and 26d and to form the modified members 35, 36 and 37. Corner portions of reduced thickness such as those indicated at 38 in FIGS. 8a and 8b may be formed in suitable locations along the plastic members to impart the desired flexibility at the corners where the members are hingedly joined together. The bar 27 and its integral hook member 27a are preferably constructed from a suitable rigid metal strip. Rivets such as those indicated at 39 in FIGS. 7a and 7b may be used to properly locate the reinforcing and fastening members within the hem of the bag and rivets 39a may be used to retain the members 35, 36 and 37 in preselected positions within the hem of the bag. It will be evident that other types of fastening means such as staples may be used for the same purpose.

To insure a suitably tight fit of the bag mouth on the tubular extension 23 or 23a of the mower outlet passage, the inside width of the frame defined by the members 26a shown in FIG. 7b when in the angularly folded position must be approximately equal to the outside width dimension of the extension member 23 and the member 26 must fit across the lower side of the tubular extension when the members 26a are extended at the sides of the tubular extension. Likewise, the length of the member 35 corresponds with the width of the tubular extension 23 or 23a across its upper side and the perimeter of the mouth opening of the bag 35 is such that the bag may be gathered snugly about the tubular extension of the mower outlet when the members 35 and 37 are retracted to underlie the member 35 with the latter extended across the top of the tubular extension.

It will be evident that the bag fastening means of this invention comprising the hingedly connected, substantially rigid members disposed to reinforce the relatively large expandable and contractable mouth opening of the bag greatly facilitate the operation of attaching the bag to and detaching it from the tubular extension defining the mower outlet passage. These attaching members may be securely held in place merely by the application of pressure to the upper side thereof as described.

I claim:

1. For a rotary lawn mower having a housing and adapted to discharge grass cuttings laterally through an opening in the housing, bag attaching means including a bracket adapted to be secured to said housing and a tubular extension of said bracket defining a restricted passage for said grass cuttings, the improvements which comprise: a bag having a relatively large mouth portion at one end adapted to be wrapped around said tubular extension and a normally closed end for confining grass cuttings received through said mouth portion, said bag having a hem encompassing the mouth thereof, a plurality of straight, substantially rigid bag fastening members hingedly joined together and contained in said hem, said members being extensible and retractable angularly one relative to the others to permit selective expansion and contraction of said mouth portion of the bag, a bag support arm hingedly joined to said bracket and disposed to extend obliquely upwardly therefrom to support said closed end of the bag, means for detachably supporting the bag on said arm, means for securing said members in retracted position together with the mouth portion of the bag about said tubular extension of said bracket, said securing means comprising a clamp disposed to overlie said retracted members on said tubular extension to retain the same under compression, and a pressure plate operatively connected to said arm whereby to hold said members under compression when said arm is extended in bag supporting position.

2. For a rotary lawn mower having a housing adapted to discharge grass cuttings laterally through an opening in said housing, bag attaching means including a bracket adapted to be secured to said housing and a tubular extension of said bracket defining a restricted passage for said grass cuttings, the improvements which comprise, a bag having a relatively large mouth portion at one end adapted to be wrapped around said tubular extension and a normally closed end for confining grass cuttings received through said mouth portion, a plurality of straight substantially rigid bag fastening members hingedly joined together and connected to said mouth portion of the bag, said members being extensible and retractable angularly one relative to the others to permit selective expansion and contraction of said mouth portion of the bag, a bag support arm hingedly joined to said bracket and disposed to extend obliquely upward therefrom to support said closed end of said bag, said bag support arm having rigid sections hingedly connected together end to end and adapted to be retracted to positions in which said sections project upwardly from said mower housing, means for detachably supporting the bag on said arm, and means for securing said members in retracted position together with said mouth portion of the bag about said tubular extension on said bracket comprising, a pressure plate rigidly connected to said arm and disposed to overlie a plurality of said retracted bag fastening members on said tubular extension of the bracket and to retain the same under compression when said arm is extended in bag supporting position.

References Cited by the Examiner
UNITED STATES PATENTS

| | | | |
|---|---|---|---|
| 2,734,220 | 2/56 | Tschudy | 15—351 X |
| 2,932,146 | 4/60 | Campbell | 56—202 |
| 3,008,284 | 11/61 | Bright | 56—202 X |
| 3,165,877 | 1/65 | Leader et al. | 56—202 |

ABRAHAM G. STONE, *Primary Examiner.*

ANTONIO F. GUIDA, *Examiner.*